(12) United States Patent
Zhang et al.

(10) Patent No.: US 10,181,024 B2
(45) Date of Patent: Jan. 15, 2019

(54) METHOD, DEVICE, AND SYSTEM FOR UPDATING AUTHENTICATION INFORMATION

(71) Applicant: TENCENT TECHNOLOGY (SHENZHEN) COMPANY LIMITED, Shenzhen, Guangdong (CN)

(72) Inventors: Wenpeng Zhang, Shenzhen (CN); Chen Gong, Shenzhen (CN); Wenjing Zhang, Shenzhen (CN); Yiyong Yang, Shenzhen (CN); Jiawei Jiang, Shenzhen (CN); Guoguo Liu, Shenzhen (CN); Yaqin Guo, Shenzhen (CN); Yinbo Song, Shenzhen (CN); Mingheng Zhong, Shenzhen (CN); Shaobo Liao, Shenzhen (CN); Yawei Du, Shenzhen (CN); Leilei Li, Shenzhen (CN); Lin Huang, Shenzhen (CN); Zhiyong Lan, Shenzhen (CN); Fumin Zhou, Shenzhen (CN); Huashan Li, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 194 days.

(21) Appl. No.: 15/144,872

(22) Filed: May 3, 2016

(65) Prior Publication Data
US 2016/0246958 A1    Aug. 25, 2016

Related U.S. Application Data

(63) Continuation of application No. PCT/CN2014/093903, filed on Dec. 16, 2014.

(30) Foreign Application Priority Data

Dec. 31, 2013 (CN) .......................... 2013 1 0754682

(51) Int. Cl.
*G06F 21/45* (2013.01)
*G06Q 20/12* (2012.01)
(Continued)

(52) U.S. Cl.
CPC ............. *G06F 21/45* (2013.01); *G06Q 20/12* (2013.01); *G06Q 40/02* (2013.01); *H04M 15/68* (2013.01)

(58) Field of Classification Search
CPC ......... G06F 21/45; G06Q 20/12; G06Q 40/02
See application file for complete search history.

(56) References Cited

U.S. PATENT DOCUMENTS

2013/0198824 A1* 8/2013 Hitchcock ............... G06F 21/00
726/6
2015/0052035 A1* 2/2015 Calman .................. G06Q 40/02
705/35

FOREIGN PATENT DOCUMENTS

CN    101217704 A    7/2008
CN    101727706 A    6/2010
(Continued)

OTHER PUBLICATIONS

International Search Report for PCT/CN2014/093903 dated Mar. 23, 2015.
(Continued)

*Primary Examiner* — Oleg Korsak
(74) *Attorney, Agent, or Firm* — Sughrue Mion, PLLC

(57) ABSTRACT

The present disclosure discloses a method, a device, and a system for updating authenticating information in the field of Internet technologies. The method comprises: receiving a service processing request containing user information and service object information; extracting according to the user information, first authentication information associated with the service object information from prestored authentication
(Continued)

information; authenticating the first authentication information; displaying an information update interface when the first authentication information fails to be authenticated; obtaining second authentication information from the information update interface; replacing the first authentication information with the second authentication information; authenticating the second authentication information; and processing the service processing request if the second authentication information is authenticated.

20 Claims, 10 Drawing Sheets

(51) Int. Cl.
*G06Q 40/02* (2012.01)
*H04M 15/00* (2006.01)

(56) References Cited

FOREIGN PATENT DOCUMENTS

| CN | 102880959 A | 1/2013 |
|---|---|---|
| CN | 103034941 A | 4/2013 |
| KR | 10-2010-0099625 A | 9/2010 |
| KR | 10-2013-0100866 A | 9/2013 |

OTHER PUBLICATIONS

Written Opinion for PCT/CN2014/093903 dated Mar. 23, 2015.
Communication dated Dec. 18, 2017, issued by the Intellectual Property Office of Korea in counterpart application No. 10-2016-7013745.
Communication dated Jun. 27, 2018, issued by the Korean Intellectual Property Office in corresponding Korean Application No. 10-2016-7013745.

\* cited by examiner

METHOD, DEVICE, AND SYSTEM FOR UPDATING AUTHENTICATION INFORMATION

CROSS-REFERENCE TO RELATED APPLICATIONS

The application claims priority to Chinese Patent Application No. 201310754682.0, filed on Dec. 31, 2013, which is incorporated by reference in its entirety.

FIELD OF THE INVENTION

The present invention relates to the field of Internet technologies and more particularly to a method, a device, and a system for updating authenticating information.

BACKGROUND TECHNOLOGY

With rapid development of the Internet, more and more services are chosen to be processed via the Internet, for example, the payment service. While these services are processed, the system needs to authenticate the authentication information that is tied to the service object information associated with the user information, and can continue the service processing flow only when the authentication is successful.

In practice, the authentication information associated with the service object information may fail to be authenticated due to modifications made by users, and the unsuccessful authentication leads to the failure of the service processing. Therefore, an appropriate authentication method is required after an information update.

SUMMARY OF THE INVENTION

The examples of the present disclosure provide a method, a device, and a system for updating authenticating information. The technical solution is as follows:

In one aspect, a method for updating authenticating information is provided, the method comprising: receiving, by a processor, a service processing request containing user information and service object information; extracting, by the processor, according to the user information, first authentication information associated with the service object information from prestored authentication information; authenticating, by the processor, the first authentication information; displaying, by the processor, an information update interface when the first authentication information fails to be authenticated; obtaining, by the processor, second authentication information from the information update interface; replacing, by the processor, the first authentication information with the second authentication information; authenticating, by the processor, the second authentication information; and processing, by the processor, the service processing request if the second authentication information is authenticated.

In another aspect, the technical solution provides a device for updating authenticating information, the device comprising: a first acquisition module having one or more processors coupled with a memory that is used to obtain a service processing request containing user information and service object information; an extracting module having one or more processors coupled with a memory that is used to extract first authentication information associated with the service object information from prestored authentication information according to the user information; a first authenticating module having one or more processors coupled with a memory that is used to authenticate the first authentication information; a first displaying module having one or more processors coupled with a memory that is used to display an information update interface when the first authenticating module fails to authenticate the first authentication information; a second acquisition module having one or more processors coupled with a memory that is used to obtain second authentication information from the information update interface; a second authenticating module having one or more processors coupled with a memory that is used to authenticate the second authentication information by replacing the first authentication information with the second authentication information; a first processing module having one or more processors coupled with a memory that is used to process the service processing request if the second authenticating module authenticates the second authentication information.

Furthermore, the technical solution provides a system for updating authenticating information, wherein the system comprises a client, a service processing server, and an authentication server; wherein, the service processing server is used to: obtain a service processing request containing user information and service object information sent by a client, extract first authentication information associated with the service object information from prestored authentication information according to the user information, and send the first authentication information to the authentication server for authentication; wherein the service processing server receives a first authentication result sent by the authentication server; and when the first authentication result indicates that the first authentication information is not authenticated, the client displays an information update interface, obtains second authentication information from the information update interface, and sends the second authentication information to the service processing server; wherein the service processing server receives the second authentication information sent by the client, replaces the first authentication information with the second authentication information, and sends the second authentication information to the authentication server for authentication; wherein the service processing server receives the second authentication result sent by the authentication server; and if the second authentication result indicates that the second authentication information is authenticated, the service processing server processes the service processing request.

The technical solution provided by the examples of the present disclosure has the following beneficial effects:

When the first authentication information fails to be authenticated, the present disclosure displays an information update interface, obtains second authentication information from the information update interface, and authenticates the second authentication information; if the second authentication information is authenticated, the present disclosure processes the service processing request.

During the whole process, the present disclosure does not exit the service processing flow. Therefore, after the second authentication information is authenticated, the present disclosure processes the service processing request, thereby ensuring the security of service processing.

During the whole process, the present disclosure does not exit the service processing flow, that is, the present disclosure does not need to begin the whole service flow again. Therefore, the operation flow is simple, and the success rate is high.

DESCRIPTION OF DRAWINGS

For a better description of the technical solution provided in the examples of the present disclosure, the following section briefly describes the drawings required for describing the examples of the present disclosure. Obviously, the following drawings are only some examples of the present disclosure from which other drawings may be derived by a person skilled in the art without any creative effort.

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAIL DESCRIPTION

Figure 1:
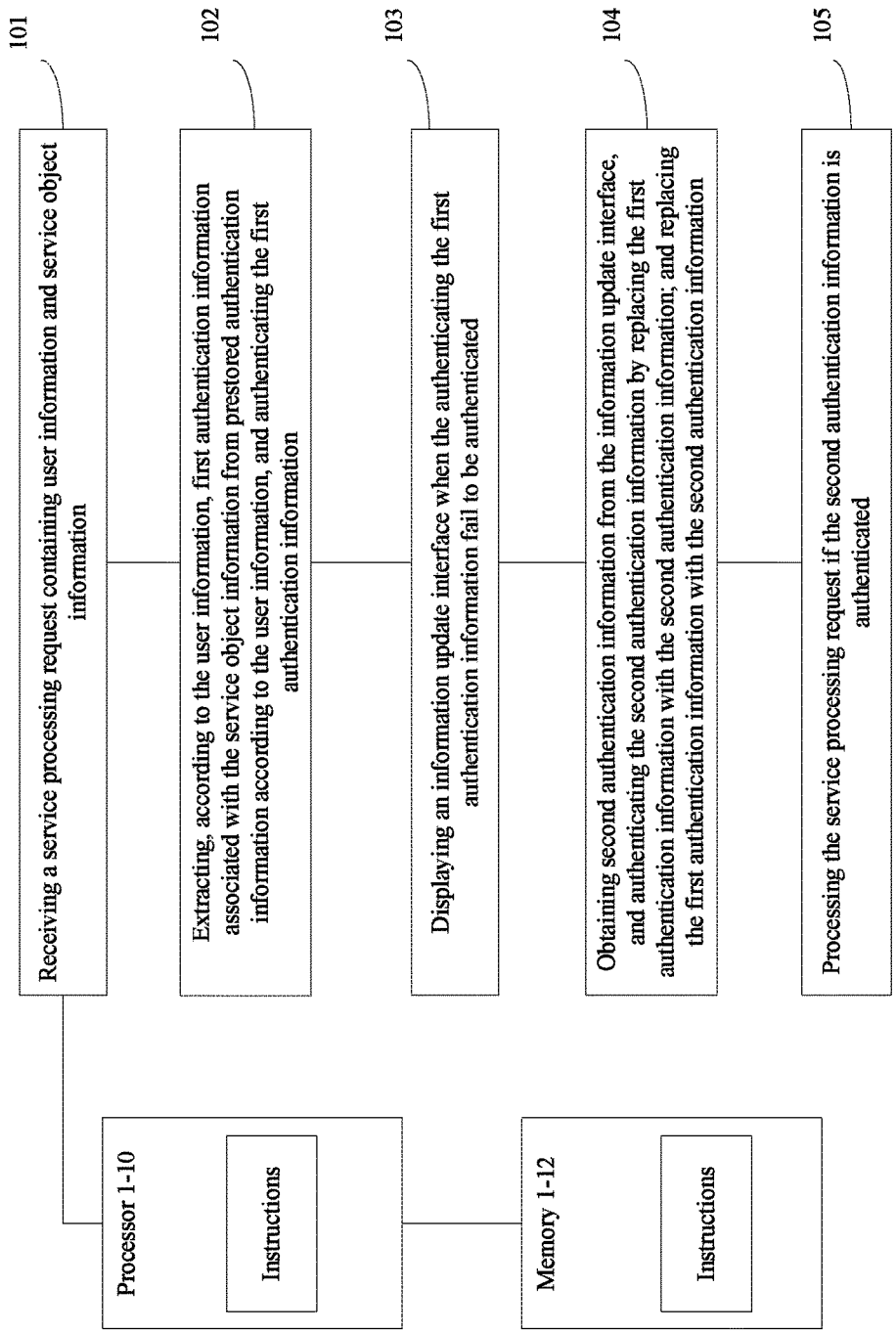
FIG. 1 shows the flowchart of a method for updating authenticating information provided in example 1 of the present disclosure.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment. Furthermore, the particular features, structures, or characteristics may be combined in any suitable manner in one or more embodiments or examples.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the terms "module," "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

It should be noticed that, the embodiments/examples and the features in the embodiments/examples may be combined with each other in a no conflict condition. This invention will become apparent from the following detailed description when taken in conjunction with the accompanying drawings.

It should be noticed that, the steps illustrated in the flowchart of the drawings may be performed in a set of computer device with executable program codes. And the order of the steps may be different from that in the drawings under some status, although a logic order is shown in the flowchart.

From related technologies, a method for updating authenticating information is provided, wherein, if the user does not modify the authentication information tied to the service object information after the authentication information is updated, the service processing will fail due to the failure in authentication; in this case, the system exits the service flow, the user needs to manually modify the authentication information associated with the service object information or rebinds the service object information to the authentication information, and then the system will implement the service flow again.

During the implementation of the present invention, the inventor finds that the above method has at least the following problem:

If the user does not modify the authentication information tied to the service object information after an information update, service processing will fail due to failure in authentication; in this case, the system needs to exit the service flow and the user needs to modify the authentication information tied to the service object information, leading to lower security and the need to perform the service flow again. Therefore, the service processing is complex with low success rates and requires many repetitive operations.

To explain the purposes, technical solution and advantages of the present disclosure more clearly, the following section gives a detailed description of the examples of the present disclosure in conjunction with attached drawings.

Example 1

Take a payment service as an example. After authentication information is updated, the payment service will fail if the authentication information fails to be authenticated; then, the system needs to exit the payment flow, the user needs to modify the authentication information tied to the service object information, and the system needs to implement the payment flow again. Therefore, the above process is relatively complex and involves many repetitive operations, causing bad user experience and low success rate.

To overcome the above problems, the examples of the present disclosure provide a method for updating authenticating information, wherein the method may be applied to a server. As shown in FIG. 1, the method provided in this example comprises:

101: Receiving a service processing request containing user information and service object information;

102: Extracting, according to the user information, first authentication information associated with the service object information from prestored authentication information according to the user information, and authenticating the first authentication information;

103: Displaying an information update interface when the first authentication information fails to be authenticated;

104: Obtaining second authentication information from the information update interface, and authenticating the second authentication information by replacing the first authentication information with the second authentication information; and replacing the first authentication information with the second authentication information;

105: Processing the service processing request if the second authentication information is authenticated.

Steps shown in FIG. 1 may be performed by one or more processor 1-10 to execute instructions stored in memory 1-12.

In this example, if the first authentication information fails to be authenticated, the present disclosure displays an information update interface, obtains the second authentication information from the information update interface, and authenticates the second authentication information; if the second authentication information is authenticated, the present disclosure processes the service processing request. During the whole process, the present disclosure does not exit the service processing flow. Therefore, after the second authentication information is authenticated, the present disclosure processes the service processing request, thereby ensuring the security of service processing. During the whole process, the present disclosure does not exit the service processing flow, that is, the present disclosure does not need to begin the whole service flow again. Therefore, the operation flow is simple, and the success rate is high.

Example 2

Figure 2:
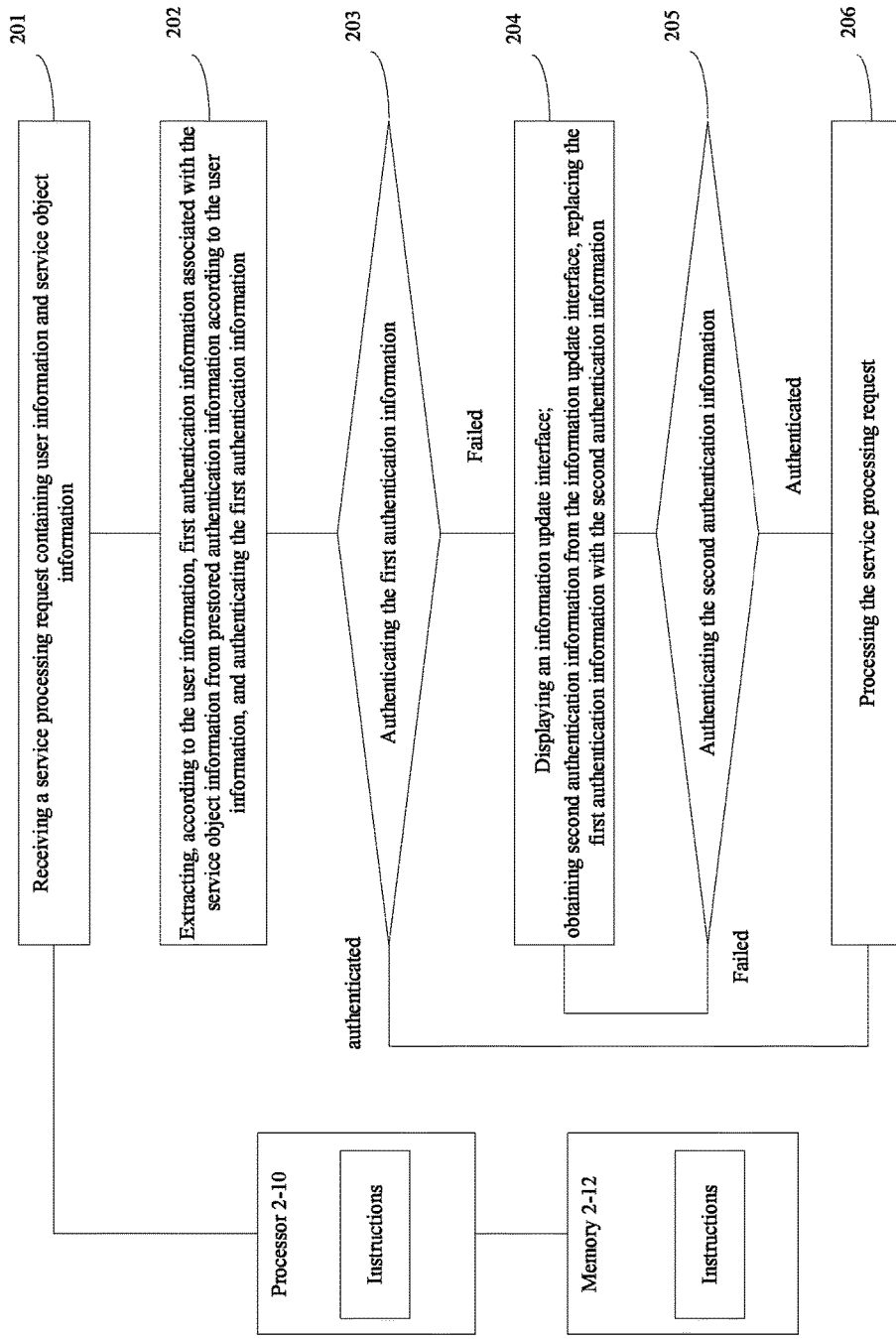
FIG. 2 shows the flowchart of a method for updating authenticating information provided in example 2 of the present disclosure.

This example provides a method for updating authenticating information. In conjunction with the content described in example 1, example 2 exemplifies the method by using a server as the executing entity. As shown in FIG. 2, the method provided in this example comprises:

201: Receiving a service processing request containing user information and service object information;

This example does not specifically restrict the mode of obtaining a service processing request containing user information and service object information, including but not limited to: the server receiving terminal obtains a service processing request containing user information and service object information that a user inputs through an operation interface of the terminal, and sends the obtained service processing request to the server, and then the server receives the service processing request for use as a service processing request containing user information and service object information.

The user information may be the account information of a third-party payment platform, the service object information may be such information as bank card information, and the service processing request may be determined according to the specific content of the user information and service object information. The user information, service object information, and service processing request may be other content according to actual conditions. This example does not restrict the content of user information and service object information, nor the content of the service processing request.

For the convenience of understanding, this example assumes that the user information is the account information of a third-party payment platform, the service object information is the bank card information included in the account information, and the service processing request is a payment service processing request generated when a user makes payment through a third-party payment platform.

After online shopping, the user logs into a third-party payment platform and makes payment for online shopping through the third-party payment platform. The account information used to log into the third-party payment platform is user information. The user's account information may be tied to multiple bank cards, each bank card is associated with the information of one bank card, and the bank card information can include bank card names and bank names, and is the service object information. Before making payment, the user needs to choose the e-bank account associated with a specific bank card, that is, determine the bank card information. After obtaining the user's account information used for login and the determined bank card information, the terminal uses account settlement and payment as a payment service processing request. The payment service processing request contains the user's account information and the bank card information determined by the user. The terminal sends the obtained payment service processing request to the server of a third-party payment platform, and the server of the third-party platform receives the payment service processing request containing account information and bank card information, that is, obtain a service processing request containing user information and service object information.

Further, for the convenience of subsequent authentication operations, the server may obtain and store at least one piece of service object information associated with user information and the authentication information associated with each piece of service object information before obtaining the service processing request containing user information and service object information, wherein the at least one piece of service object information associated with user information includes the service object information contained in the service processing request.

Each set of service object information is tied to one set of authentication information including but not limited to term of validity and contact information tied to the service object. This example does not restrict the content of the authentication information. In addition, this example does not restrict the mode of obtaining at least one set of service object information associated with user information and the authentication information associated with each of the at least one set of service object information, including but not limited to: displaying an information setting interface associated with the user information, wherein the information setting interface displays an input box for setting the service object information and an input box for setting the associated authentication information; obtaining the inputted service object information and the authentication information tied to the inputted service object information from the information setting interface, and thus obtaining the at least one set of service object information associated with user information and the authentication information associated with each of the at least one set of service object information.

For the convenience of understanding, this example still assumes that the service processing request is a payment service processing request: after the user logs into a third-party payment platform, the terminal obtains an information setting interface associated with the user's account information from the server and then displays the information setting interface. The information setting interface displays an input box for setting the bank card information and an input box for setting the authentication tied to the bank card information. The user can first input bank card information in the input box for setting the bank card information, for example, the information setting interface provides a field for the user to select a specific bank and then the user inputs the bank card number registered with the bank. Subsequently, the user inputs the authentication information of the bank card in the input box for setting the authentication information tied to the bank card, including term of validity, bound mobile phone number, and email. After the user confirms the input, the terminal can obtain the bank card information and the authentication information tied to the bank card from the information update interface. When the user holds multiple bank cards, the user can repeat the process of inputting and setting so that the terminal can obtain the information of multiple bank cards and the authentication information tied to the multiple bank cards.

For the convenience of subsequent authentication operation, the terminal can obtain at least one piece of service object information associated with the user information and the authentication information associated with each piece of service object information and then send them to the server for storage. The above information may be stored in the modes as described in Table 1:

TABLE 1

| User Information | Service Object Information | Authentication Information |
|---|---|---|
| User Information 1 | Service Object Information 1_1 | Authentication Information 1_1 |
|  | Service Object Information 1_2 | Authentication Information 1_2 |
|  | ... | ... |
| User Information 2 | Service Object Information 2_1 | Authentication Information 2_1 |
|  | Service Object Information 2_2 | Authentication Information 2_2 |
|  | ... | ... |
| ... | ... | ... |

The above information can also be stored in other modes, which are not specifically restricted by this example. Note that when the user inputs a service processing request containing user information and service object information through an operation interface of the terminal, the service object information derives from the service object information stored in the server; therefore, the at least one piece of service object information associated with the user information stored in the server includes the service object information contained in the service processing request.

For example, after the user logs into a third-party payment platform for payment, the terminal obtains all bank card information from the bank card information included in the user's account information prestored in the server and then displays the bank card information; next, the user selects a specific bank card for payment. In other words, the bank card information included in the user's account information prestored in the server includes the bank card information contained in any obtained payment service processing request.

Further, when the term of validity of the user's any bank card or a mobile phone number reserved by the user is changed, at least one piece of service object information associated with the user information and the authentication information associated with each piece of service object information stored in the server need to be updated. In this case, this example provides a method for updating at least one piece of service object information associated with the user information and the authentication information associated with each piece of service object information stored in the server, comprising: displaying an information update option in a service processing interface; displaying an information update interface upon detecting that the information update option is selected; obtaining the updated authentication information from the information update interface, and replacing the prestored authentication information with the updated authentication information.

For the convenience of understanding, this example explains the above method also by using a payment service processing request as the service processing request: the service processing interface displays an information update option (for example, an update button) used for the user to input an information update command; when the user clicks the information update option, the system displays an information update interface for the user to input bank card information and authentication information associated with the bank card information. The terminal obtains the bank card information and updated authentication information associated with the bank card information inputted by the user from the information update interface, and sends the obtained information to the server. The server replaces the prestored bank card information and associated authentication information with the received bank card information included in the user's account information and the updated authentication information associated with the bank card information.

The user can input bank card information and authentication information associated with the bank card information in the information update interface by using the following method: the terminal obtains the bank card information included in the user's account information, and displays the bank card information included in the user's account information in the information update interface in the form of a list; wherein each list item is one piece of bank card information and is preceded by one check box. The user can click the check box before a list item, indicating that the user needs to update the authentication information associated with the bank card information in the list item. Likewise, the terminal can display all authentication information associated with the bank card information in the form of a list, wherein each list item contains an input box used for the user to input new authentication information.

For example, the terminal learns the two bank cards (bank card 1 and bank card 2) included in the user's account information, and displays the information (for example, bank card number and bank name) of the two bank cards in the information update interface in the form of a list. Each list item is associated with one bank card and is preceded by one check box. When the user clicks a check box (for example, the check box associated with bank card 1), the terminal can obtain the type of authentication information associated with bank card 1 according to the bank card number of bank card 1. For example, bank card 1 is associated with two types of authentication information: mobile phone number tied to bank card 1 and term of validity of bank card 1. Upon obtaining the type of authentication information associated with bank card 1, the terminal displays the two types of authentication information in the form of a list. Each list item contains an input box. To update one type of authentication information, the user can input the updated information in the input box associated with the authentication information.

202: Extracting, according to the user information, the first authentication information associated with service object information from the prestored authentication information;

This example does not restrict the mode of extracting the first authentication information tied to service object information among the prestored authentication information, including but not limited to: querying the associated authentication information from the table of mapping between user information, service object information, and authentication information stored in the server according to user information and service object information, and extracting the content of the associated authentication information for use as the first authentication information.

For example, Table 1 shows the mapping between user information, service object information, and authentication information stored in the server. When the user information contained in the obtained service processing request is user information 1 and the service object information contained in the obtained service processing request is service object information 2, the present disclosure can find the associated authentication information 1_2 from Table 1 according to the information contained in the service processing request, and extract the content of authentication information 1_2 for use as the first authentication information.

203: Authenticating the first authentication information, and proceeding to Step 206 if the first authentication information is authenticated, or proceeding to Step 204 if the first authentication information fails to be authenticated;

This example does not restrict the mode of authenticating the first authentication information, including but not limited to: sending the first authentication information to the authentication server, comparing the received first authentication information with the updated authentication information prestored in the authentication server, and passing the authentication if they are the same, or failing the authentication if they are different. Upon completing the authentication, the authentication server sends the authentication result to the server. The server executes Step 206 if the authentication result is passed, or executes Step 204 if the authentication result is failed.

For the convenience of understanding, this example explains the above method by using a payment service processing request as a service processing request: the third-party payment platform extracts the bank card information contained in the payment service processing request, determines the bank associated with the bank card information and thus the authentication server address of the bank, and sends the first authentication information to the authentication server address. Upon receiving the first authentication information, the authentication server compares the first authentication information with the locally stored authentication information. If they are the same, the first authentication information is authenticated; otherwise, the first authentication information fails to be authenticated. For example, if the authentication information includes the user's contact information and term of validity of the bank card, the authentication server can compare the contact information and term of validity between the first authentication information and the locally stored authentication information, and determine whether they are the same.

204: Displaying an information update interface, obtaining second authentication information from the information update interface, and replacing the first authentication information with the second authentication information;

For the implementation mode of this step, please refer to the flow described in Step 201 above and it may not be repeated again here. Note that the information update interface displayed at this step may be the same as or different from the information update interface displayed in the preceding step. The information update interface displayed at this step is used to recommend the user to update the authentication information when the authentication result is failed, while the information update interface displayed in the preceding step is used for the user to actively update the authentication information. In different application scenarios, the information update interfaces displayed at different steps may be designed differently, which is not specifically provided in this example.

205: Authenticating the second authentication information, and proceeding to Step 206 if the second authentication information is authenticated, or proceeding to Step 204 if the second authentication information fails to be authenticated;

Refer to the flow of the method described in Step 203 for the implementation of the method, which is not to be repeated here.

206: Processing the service processing request.

This example does not restrict the mode of processing the service processing request, including but not limited to: presetting the service processing logics associated with different service processing requests, determining the service processing logic associated with a specific service processing request, and processing the service processing request by using the predetermined service processing logic. The service processing logics associated with service processing requests may be set according to actual conditions, and this example does not restrict the content of the service processing logics associated with service processing requests.

For example, if the service processing request is a payment service processing request, the present disclosure processes the payment service processing request by using a preset payment service processing logic, for example, the service logic of determining the deduction, deducting money, and returning a receipt, which is not specifically restricted in this example.

In this example, if the first authentication information fails to be authenticated, the present disclosure displays an information update interface, obtains the second authentication information from the information update interface, and authenticates the second authentication information; if the second authentication information is authenticated, the present disclosure processes the service processing request. During the whole process, the present disclosure does not exit the service processing flow. Therefore, after the second authentication information is authenticated, the present disclosure processes the service processing request, thereby ensuring the security of service processing. During the whole process, the present disclosure does not exit the service processing flow, that is, the present disclosure does not need to begin the whole service flow again. Therefore, the operation flow is simple, and the success rate is high.

Example 3

Figure 3:
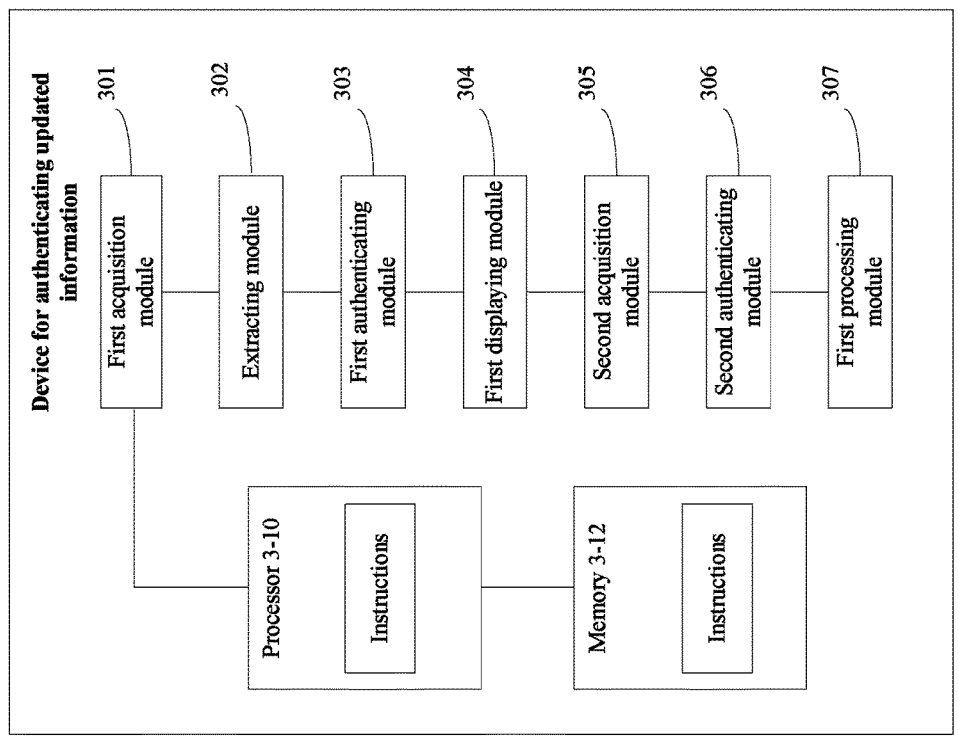
FIG. 3 shows the structure diagram of the first device for updating authenticating information provided in example 3 of the present disclosure.

This example provides a device for updating authenticating information, wherein the device is used to implement the method for updating authenticating information provided in example 1 or example 2. As shown in FIG. 3, the device comprises:

a first acquisition module (301), used to obtain a service processing request containing user information and service object information;

an extracting module (302), used to extract first authentication information tied to the service object information from prestored authentication information according to user information;

a first authenticating module (303), used to authenticate the first authentication information;

a first displaying module (304), used to display an information update interface when the first authentication information fails to be authenticated;

a second acquisition module (305), used to obtain second authentication information from the information update interface;

a second authenticating module (306), used to authenticate the second authentication information upon replacing the first authentication information with the second authentication information;

a first processing module (307), used to process the service processing request if the second authentication information is authenticated.

Each module in FIG. 3 may have one or more processors 3-10 coupled with memory 3-12 to execute instructions stored in memory 3-12.

Figure 4:
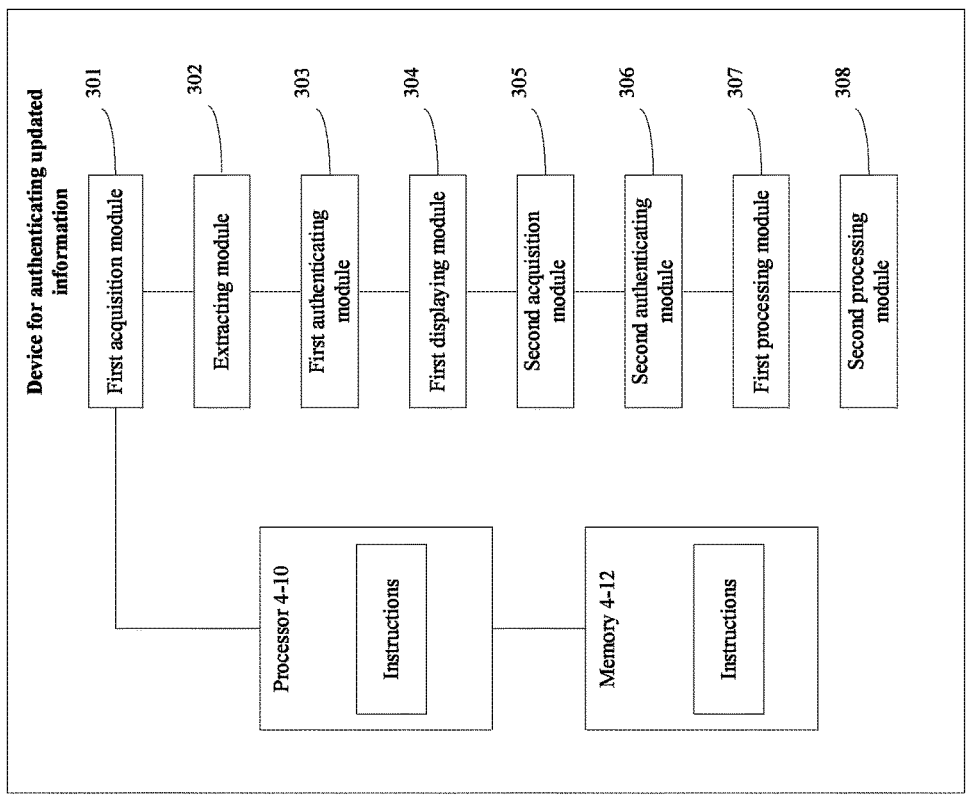
FIG. 4 shows the structure diagram of the second device for updating authenticating information provided in example 3 of the present disclosure.

As shown in FIG. 4, the device for updating authenticating information provided in this preferred example further comprises:

A second processing module (308), used to process a service processing request if the first authentication information is authenticated.

Each module in FIG. 4 may have one or more processors 4-10 coupled with memory 4-12 to execute instructions stored in memory 4-12.

Figure 5:
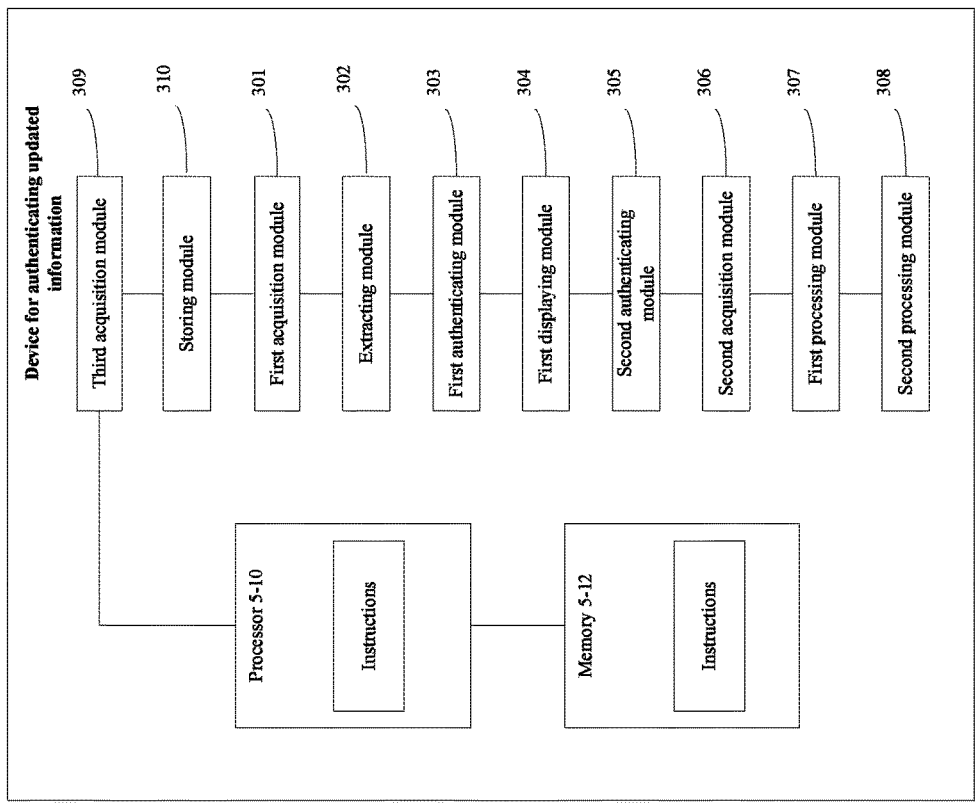
FIG. 5 shows the structure diagram of the third device for updating authenticating information provided in example 3 of the present disclosure.

As shown in FIG. 5, the device for updating authenticating information provided in this preferred example further comprises:

a third acquisition module (309), used to obtain at least one piece of service object information associated with user information and the authentication information associated with each piece of service object information, wherein the at least one piece of service object information associated with user information includes the service object information contained in the service processing request;

a storing module (310), used to store the at least one set of service object information associated with the information and the authentication information associated with each of the at least one set of service object information.

Each module in FIG. 5 may have one or more processors 5-10 coupled with memory 5-12 to execute instructions stored in memory 5-12.

Figure 6:
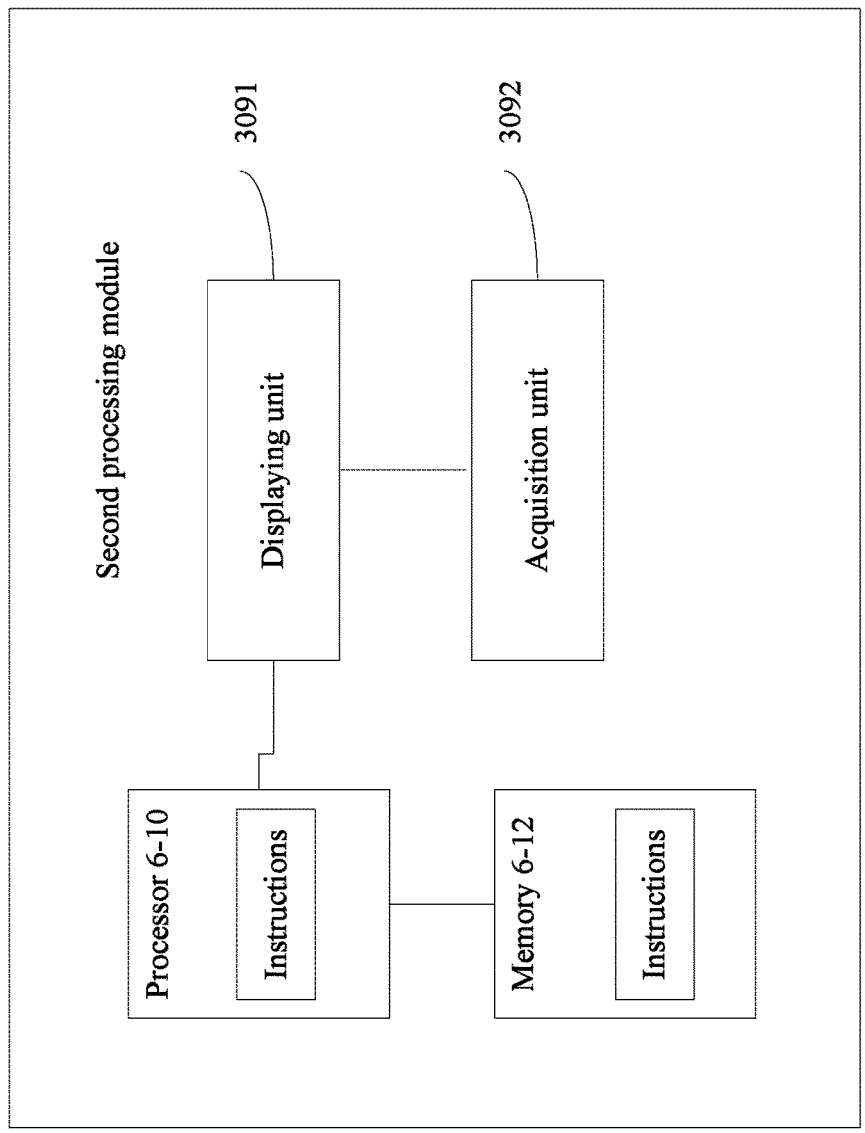
FIG. 6 shows the structure diagram of a third acquisition module provided in example 3 of the present disclosure.

As shown in FIG. 6, the third acquisition module (309) provided in this preferred example comprises:

A displaying unit (3091), used to display an information setting interface associated with user information, wherein the information setting interface displays an input box for setting the service object information and an input box for setting the bound authentication information;

An acquisition unit (3092), used to obtain the inputted service object information and the authentication information tied to the inputted service object information from an information setting interface, and obtain at least one piece of service object information associated with user information and the authentication information associated with each piece of service object information.

Each unit in FIG. 6 may have one or more processors 6-10 coupled with memory 6-12 to execute instructions stored in memory 6-12.

Figure 7:
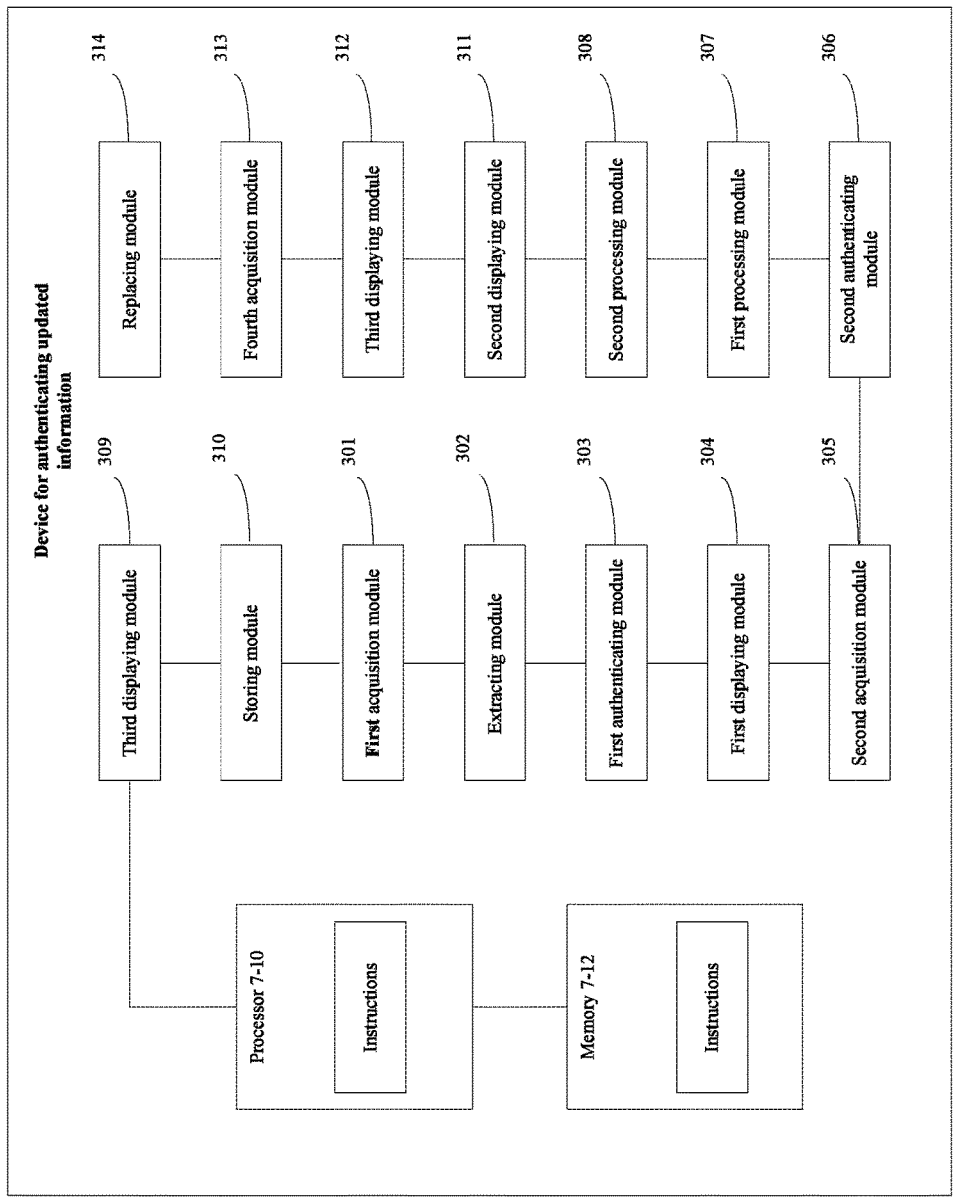
FIG. 7 shows the structure diagram of the fourth device for updating authenticating information provided in example 3 of the present disclosure.

As shown in FIG. 7, the device for updating authenticating information provided in this preferred example further comprises:

a second displaying module (311), used to display an information update option in a service processing interface;

a third displaying module (312), used to display an information update interface upon detecting that the information update option is selected;

a fourth acquisition module (313), used to obtain the updated authentication information from the information update interface;

a replacing module (314), used to replace the prestored authentication information with the updated authentication information.

Each module in FIG. 7 may have one or more processors 7-10 coupled with memory 7-12 to execute instructions stored in memory 7-12.

In this example, if the first authentication information fails to be authenticated, the device displays an information update interface, obtains the second authentication information from the information update interface, and authenticates the second authentication information; if the second authentication information is authenticated, the device processes the service processing request. During the whole process, the device does not exit the service processing flow. Therefore, after the second authentication information is authenticated, the device processes the service processing request, thereby ensuring the security of service processing. During the whole process, the device does not exit the service processing flow, that is, the device does not need to begin the whole service flow again. Therefore, the operation flow is simple, and the success rate is high.

Example 4

Figure 8:
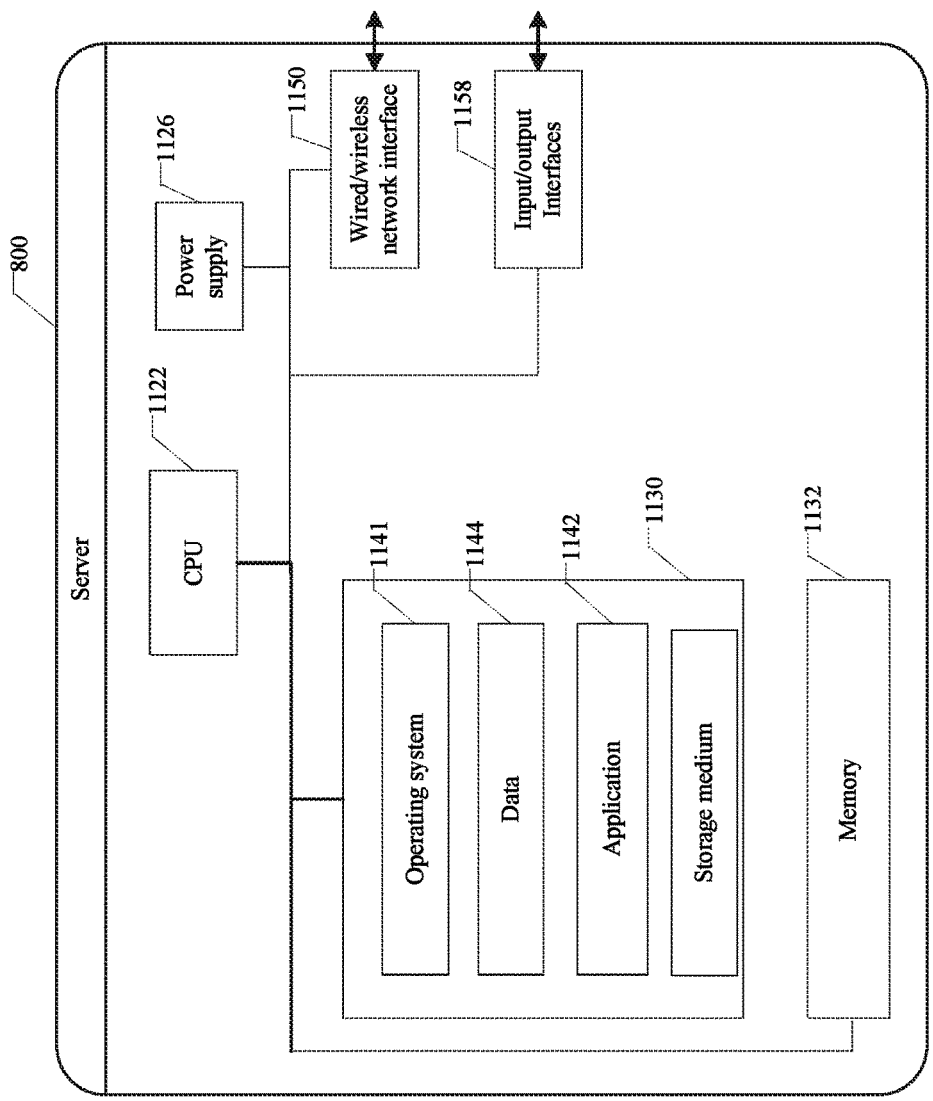
FIG. 8 shows the structure diagram of a server provided in example 4 of the present disclosure.

This example provides a server used to implement the method for updating authenticating information provided in Example 1 or Example 2. As shown in FIG. 8, the server (800) comprises:

The server (800) may vary greatly with configurations or performance, and may comprise at least one CPU (1122) and memory (1132), and at least one storage medium (1130) for storing the application (1142) or the data (1144), wherein, the memory (1132) and the storage medium (1130) can store data transiently or persistently, the programs stored in the storage medium (1130) can include at least one module (not illustrated), each of which can include a series of operation instructions to the server. Further, the CPU (1122) may be configured to communicate with the storage medium (1130), and to have the server (800) execute a series of operation instructions stored in the storage medium (1130).

The server (800) can comprise at least one power supply (1126), at least one wired/wireless network interface (1150), at least one input/output interface (1158), and/or at least one operating system (1141) including Windows, Server™, Mac OS X™, Unix™, Linux™, and FreeBSD™.

At least one program is stored in the memory and is configured to be executed by at least one processor, wherein the at least one program contains the instructions used to perform the following operations:

Obtaining a service processing request containing user information and service object information;

Extracting first authentication information tied to the service object information from prestored authentication information according to the user information, and authenticating the first authentication information;

Displaying an information update interface if the first authentication information fails to be authenticated;

Obtaining second authentication information from the information update interface, and authenticating the second authentication information upon replacing the first authentication information with the second authentication information;

Processing the service processing request if the second authentication information is authenticated.

Assume that the above is the first possible mode of implementation. In the second possible mode of implementation based on the first possible mode of implementation, the memory of the server further stores the instructions used to perform the following operations:

Processing the service processing request if the first authentication information is authenticated.

In the third possible mode of implementation based on the first or second possible mode of implementation, the memory of the server further stores the instructions used to perform the following operations:

Obtaining and storing at least one piece of service object information associated with user information and the authentication information associated with each piece of service object information, wherein the at least one piece of service object information associated with user information includes the service object information contained in the service processing request.

In the fourth possible mode of implementation based on the third possible mode of implementation, the memory of the server further stores the instructions used to perform the following operations:

Displaying an information setting interface associated with user information, wherein the information setting interface displays an input box for setting the service object information and an input box for setting the bound authentication information;

Obtaining the inputted service object information and the authentication information tied to the inputted service object information from the information setting interface, and obtaining at least one piece of service object information associated with user information and the authentication information associated with each piece of service object information.

In the fifth possible mode of implementation based on the third possible mode of implementation, the memory of the server further stores the instructions used to perform the following operations:

Displaying an information update option in a service processing interface;

Upon detecting that the information option is selected, displaying an information update interface;

Obtaining updated authentication information from the information update interface, and replacing the prestored authentication information with the updated authentication information.

In this example, if the first authentication information fails to be authenticated, the server displays an information update interface, obtains the second authentication information from the information update interface, and authenticates the second authentication information; if the second authentication information is authenticated, the server processes the service processing request. During the whole process, the server does not exit the service processing flow. Therefore, after the second authentication information is authenticated, the server processes the service processing request, thereby ensuring the security of service processing. During the whole process, the server does not exit the service processing flow, that is, the server does not need to begin the whole service flow again. Therefore, the operation flow is simple and the success rate is high.

Example 5

Figure 9:
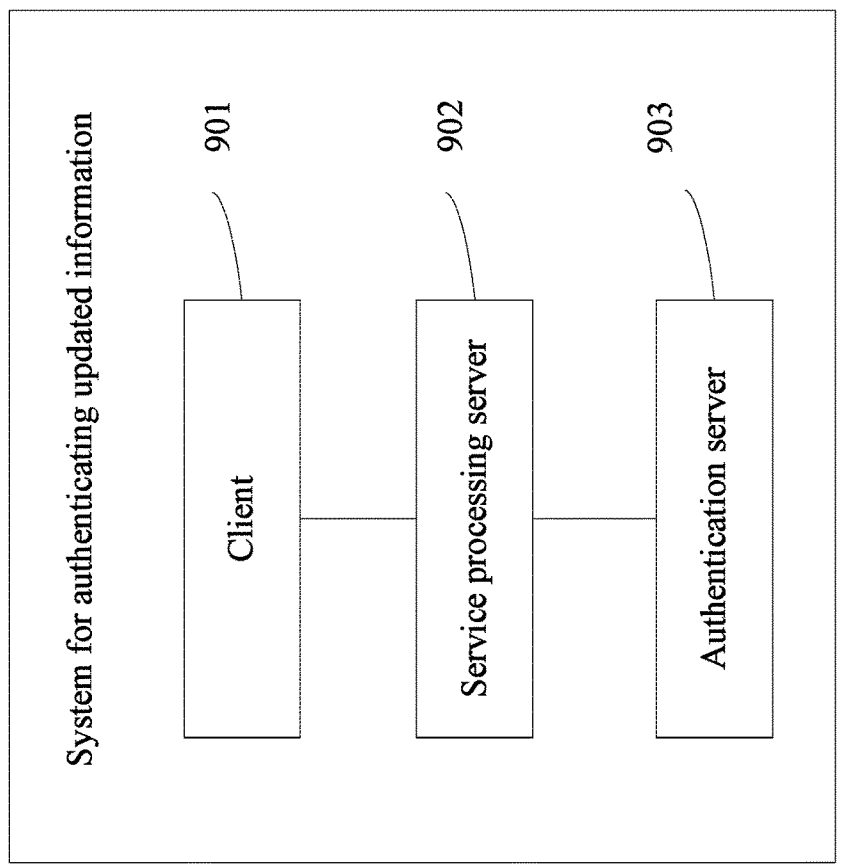
FIG. 9 shows the structure diagram of a system for updating authenticating information provided in example 5 of the present disclosure.

This example provides a system for updating authenticating information, wherein the system is used to implement the method for updating authenticating information provided in example 1 or example 2. As shown in FIG. 9, the system comprises a client (901), a service processing server (902), and an authentication server (903);

Wherein, the service processing server (902) is used to obtain a service processing request containing user information and service object information sent by the client (901), extract the first authentication information tied to the service object information among the prestored authentication information according to the user information, and send the first authentication information to the authentication server (903) for authentication;

The service processing server (902) receives the first authentication result sent by the authentication server (903); if the first authentication result is that the first authentication fails to be authenticated, the client (901) displays an information update interface, obtains the second authentication information from the information update interface, and sends the second authentication information to the service processing server (902);

The service processing server (902) receives the second authentication information sent by the client, replaces the first authentication information with the second authentication information, and sends the second authentication information to the authentication server (903) for authentication;

The service processing server (902) receives the second authentication result sent by the authentication server (9023; if the second authentication result is that the second authentication information is authenticated, the service processing server (902) processes the service processing request.

For the system for updating authenticating information provided in this preferred example, the service processing server (902) is used to process a service processing request if the first authentication result is that the first authentication information is authenticated.

The client 901, service processing server 902 and authentication server 903 shown in FIG. 9 may have one or more processors that execute instructions stored in memory.

Figure 10:
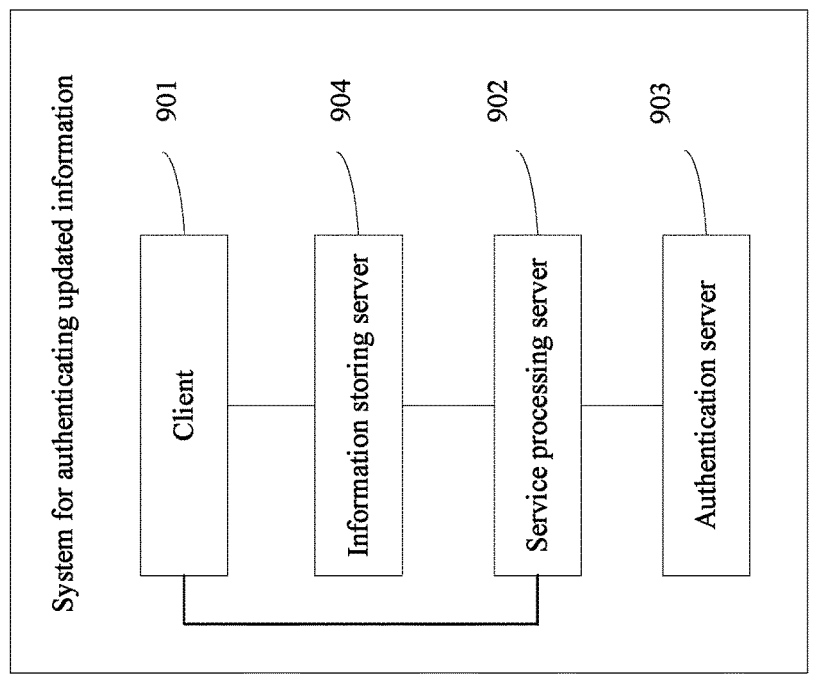
FIG. 10 shows the structure diagram of another system for updating authenticating information provided in example 5 of the present disclosure.

As shown in FIG. 10, the system for updating authenticating information provided in this preferred example further comprises an information storing server (904);

The information storing server (904) is used to obtain and store at least one piece of service object information associated with user information and the authentication information associated with each of the at least one piece of service object information, wherein the at least one piece of service object information associated with user information includes the service object information contained in the service processing request;

The service processing server (902) extracts the first authentication information tied to service object information among the authentication information stored in the information storing server (904).

For the system for updating authenticating information provided in this preferred example, the client (901) displays an information setting interface associated with user information, wherein the information setting interface displays an input box for setting the service object information and an input box for setting the bound authentication information; the client (901) obtains the inputted service object information and the authentication information tied to the inputted service object information from the interface setting interface, thus obtains at least one piece of service object information associated with user information and the authentication information associated with each piece of service object information, and sends the at least one piece of service object information associated with user information and the authentication information associated with each piece of service object information to the information storing server (904) for storage.

In this preferred example, the client (901) is further used to display an information update option in a service processing interface, display an information update interface upon detecting that the information update option is selected, and obtain the updated authentication information from the information update interface and send the updated authentication information to the information storing server (904); and the information storing server (904) is used to replace the prestored authentication information with the updated authentication information.

Client 901, information storing server 904, service processing server 902 and authentication server 903 shown in FIG. 10 may have one or more processors to execute instructions stored in memory.

In this example, if the first authentication information fails to be authenticated, the system displays an information update interface, obtains the second authentication information from the information update interface, and authenticates the second authentication information; if the second authentication information is authenticated, the system processes the service processing request.

During the whole process, the system does not exit the service processing flow. Therefore, after the second authentication information is authenticated, the system processes the service processing request, thereby ensuring the security of service processing. During the whole process, the system does not exit the service processing flow, that is, the system does not need to begin the whole service flow again. Therefore, the operation flow is simple and the success rate is high.

Note that the device for updating authenticating information provided in the above example is illustrated only by the above functional modules; in practice, the above functions may be performed by different functional modules as needed, that is, the internal structure of the device may be divided into different functional modules, so as to perform all or part of the functions described above. In addition, the above example of the device, example of the system, and example of the method for updating authenticating information are derived from the identical conception. For details on their implementation process, refer to the example of the method for updating authenticating information.

The foregoing serial numbers of examples of the present disclosure are only used for convenience, and do not indicate any superiority or inferiority of the examples.

A person skilled in the art can understand that all or some of the steps in implementing the above examples may be implemented by hardware or by instructing the related hardware with a computer program, and the computer program may be stored in a computer readable storage medium, either transitory or non-transitory wherein the abovementioned storage medium may be such as a ROM, a disk, or a CD.

The above only discloses preferred examples of the present disclosure, which do not restrict the present disclosure. Any changes, equivalent substitutions, and improvements made within the scope of spirits and principles of the present disclosure nevertheless fall within the scope of the present disclosure.

The invention claimed is:

1. A method for updating authenticating information comprising:
   receiving, by a processor, a service processing request containing user information and service object information;

extracting, by the processor, according to the user information, first authentication information associated with the service object information from prestored authentication information;

authenticating, by the processor, the first authentication information;

displaying, by the processor, an information update interface without exiting service processing flow for the service processing request when the first authentication information fails to be authenticated;

obtaining, by the processor, second authentication information from the information update interface;

replacing, by the processor, the first authentication information with the second authentication information;

authenticating, by the processor, the second authentication information; and processing, by the processor, the service processing request if the second authentication information is authenticated;

wherein, the user information is account information of a third-party payment platform, the service object information is bank card information, and the service processing request is a payment service processing request generated when a user makes payment through a third-party payment platform;

wherein the authenticating, by the processor, the first authentication information comprises the following steps:

sending, by the processor, the first authentication information to an authentication server, so that the authentication server compares the first authentication information with an updated authentication information prestored in the authentication server to generate a first authentication result; and receiving, by the processor, the first authentication result from the authentication server;

wherein the authenticating, by the processor, the second authentication information comprises the following steps:

sending, by the processor, the second authentication information to the authentication server, so that the authentication server compares the second authentication information with the updated authentication information prestored in the authentication server to generate a second authentication result; and receiving, by the processor, the second authentication result from the authentication server.

2. The method of claim 1, after the authenticating the first authentication information, further comprising:

processing, by the processor, the service processing request if the first authentication information indicates the first authentication information is authenticated.

3. The method of claim 2, further comprising:

obtaining, by the processor, at least one set of the service object information associated with the user information and the authentication information associated with each of the at least one set of the service object information and storing the at least one set of the service objection information and the authentication information, wherein the at least one set of the service object information includes the service object information contained in the service processing request.

4. The method of claim 3, wherein the obtaining at least one set of service object information associated with the user information and the authentication information associated with each of the at least one set of service object information comprises:

displaying, by the processor, an information setting interface associated with the user information, wherein the information setting interface displays a first input box for setting the service object information and a second input box for setting the associated authentication information;

obtaining, by the processor, the inputted service object information and the authentication information associated with the inputted service object information from the information setting interface.

5. The method of claim 3, after the storing at least one set of service object information associated with the user information and the authentication information associated with each of the at least one set of service object information, further comprising:

displaying, by the processor, an information update option in a service processing interface;

when detecting, by the processor, that the information update option is selected, displaying the information update interface;

obtaining, by the processor, updated authentication information from the information update interface, and replacing the prestored authentication information with the updated authentication information.

6. The method of claim 1, further comprising:

obtaining, by the processor, at least one set of the service object information associated with the user information and the authentication information associated with each of the at least one set of the service object information and storing the at least one set of the service objection information and the authentication information, wherein the at least one set of the service object information includes the service object information contained in the service processing request.

7. The method of claim 1, wherein, the first authentication information includes at least one of term of validity, bound mobile phone number, and email.

8. A device for updating authenticating information, wherein the device comprises:

a first acquisition module having one or more processors coupled with a memory that is used to receive a service processing request containing user information and service object information;

an extracting module having one or more processors coupled with a memory that is used to extract first authentication information associated with the service object information from prestored authentication information according to the user information;

a first authenticating module having one or more processors coupled with a memory that is used to authenticate the first authentication information;

a first displaying module having one or more processors coupled with a memory that is used to display an information update interface without exiting service processing flow for the service processing request when the first authenticating module fails to authenticate the first authentication information;

a second acquisition module having one or more processors coupled with a memory that is used to obtain second authentication information from the information update interface;

a second authenticating module having one or more processors coupled with a memory that is used to authenticate the second authentication information after replacing the first authentication information with the second authentication information;

a first processing module having one or more processors coupled with a memory that is used to process the service processing request if the second authenticating module authenticates the second authentication information;

wherein, the user information is account information of a third-party payment platform, the service object information is bank card information, and the service processing request is a payment service processing request generated when a user makes payment through a third-party payment platform;

wherein to authenticate the first authentication information, the one or more processors of the first authenticating module: send the first authentication information to an authentication server, so that the authentication server compares the first authentication information with an updated authentication information prestored in the authentication server to generate a first authentication result; and receive the first authentication result from the authentication server;

wherein to authenticate the second authentication information, the one or more processors of the second authenticating module: send the second authentication information to the authentication server, so that the authentication server compares the second authentication information with the updated authentication information prestored in the authentication server to generate a second authentication result; and receive the second authentication result from the authentication server.

9. The device of claim 8, wherein the device further comprises:
a second processing module having one or more processors coupled with a memory that is used to process the service processing request if the first authentication result indicates the first authenticating module authenticates the first authentication information.

10. The device of claim 9, wherein the device further comprises:
a third acquisition module having one or more processors coupled with a memory that is used to obtain at least one set of the service object information associated with the user information and the authentication information associated with each of the at least one set of the service object information, wherein the at least one set of the service object information associated with the user information includes the service object information contained in the service processing request;
a storing module having one or more processors coupled with a memory that is used to store the at least one set of the service object information associated with the user information and the authentication information associated with each of the at least one set of the service object information.

11. The device of claim 10, wherein the third acquisition module comprises:
a displaying unit having one or more processors coupled with a memory that is used to display an information setting interface associated with the user information, wherein the information setting interface displays a first input box for setting the service object information and a second input box for setting the associated authentication information;
an acquisition unit having one or more processors coupled with a memory that is used to obtain the inputted service object information and the authentication information associated with the inputted service object information from the information setting interface.

12. The device of claim 10, wherein the device further comprises:
a second displaying module having one or more processors coupled with a memory that is used to display an information update option in a service processing interface;
a third displaying module having one or more processors coupled with a memory that is used to display an information update interface when detecting that the information update option is selected;
a fourth acquisition module having one or more processors coupled with a memory that is used to obtain the updated authentication information from the information update interface;
a replacing module having one or more processors coupled with a memory that is used to replace the prestored authentication information with the updated authentication information.

13. The device of claim 8, wherein the device further comprises:
a third acquisition module having one or more processors coupled with a memory that is used to obtain at least one set of the service object information associated with the user information and the authentication information associated with each of the at least one set of the service object information, wherein the at least one set of the service object information associated with the user information includes the service object information contained in the service processing request;
a storing module having one or more processors coupled with a memory that is used to store the at least one set of the service object information associated with the user information and the authentication information associated with each of the at least one set of the service object information.

14. The device of claim 8, wherein, the first authentication information includes at least one of term of validity, bound mobile phone number, and email.

15. A system for updating authenticating information, comprising a client, a service processing server, and an authentication server;
wherein, the service processing server is used to
receive a service processing request containing user information and service object information sent by a client,
extract first authentication information associated with the service object information from prestored authentication information according to the user information, and
send the first authentication information to the authentication server for authentication, so that the authentication server compares the first authentication information with an updated authentication information prestored in the authentication server to generate a first authentication result;
wherein the service processing server receives the first authentication result sent by the authentication server, and when the first authentication result indicates that the first authentication information is not authenticated, the client displays an information update interface without exiting service processing flow for the service processing request, obtains second authentication information from the information update interface, and sends the second authentication information to the service processing server;
wherein the service processing server receives the second authentication information sent by the client, replaces the first authentication information with the second authentication information, and sends the second authentication information to the authentication server for authentication, so that the authentication server compares the second authentication information with the updated authentication information to generate a second result;

wherein the service processing server receives the second authentication result sent by the authentication serve, and if the second authentication result indicates that the second authentication information is authenticated, the service processing server processes the service processing request;

wherein, the user information is account information of a third-party payment platform, the service object information is bank card information, and the service processing request is a payment service processing request generated when a user makes payment through a third-party payment platform.

16. The system of claim 15, wherein the service processing server processes the service processing request if the first authentication result indicates that the first authentication information is authenticated.

17. The system of claim 16, wherein the system further comprises an information storing server having one or more processors coupled with a memory;

wherein the information storing server obtains at least one set of the service object information associated with the user information and the authentication information associated with each of the at least one set of the service object information and stores the at least one set of the service objection information and the authentication information, wherein the at least one set of the service object information associated with the user information includes the service object information contained in the service processing request;

wherein the service processing server extracts first authentication information associated with the service object information from the authentication information stored in the information storing server.

18. The system of claim 17, wherein the client displays an information setting interface associated with the user information, and wherein the information setting interface displays a first input box for setting the service object information and a second input box for setting the associated authentication information;

wherein the client obtains the inputted service object information and the authentication information associated with the inputted service object information from the information setting interface, obtains at least one set of service object information associated with the user information and the authentication information associated with each of the at least one set of service object information, and sends the at least one set of service object information associated with the user information and the authentication information associated with each of the at least one set of service object information to the information storing server for storage.

19. The system of claim 17, wherein the client is further used to display an information update option in a service processing interface, display an information update interface when detecting that the information update option is selected, and obtain the updated authentication information from the information update interface and send the updated authentication information to the information storing server; and wherein the information storing server is used to replace the prestored authentication information with the updated authentication information.

20. The system of claim 15, wherein the system further comprises an information storing server having one or more processors coupled with a memory;

wherein the information storing server obtains at least one set of the service object information associated with the user information and the authentication information associated with each of the at least one set of the service object information and stores the at least one set of the service objection information and the authentication information, wherein the at least one set of the service object information associated with the user information includes the service object information contained in the service processing request;

wherein the service processing server extracts first authentication information associated with the service object information from the authentication information stored in the information storing server.

* * * * *